US007822980B2

(12) United States Patent
Botz et al.

(10) Patent No.: US 7,822,980 B2
(45) Date of Patent: *Oct. 26, 2010

(54) AUTHENTICATED IDENTITY PROPAGATION AND TRANSLATION WITHIN A MULTIPLE COMPUTING UNIT ENVIRONMENT

(75) Inventors: Patrick S. Botz, Rochester, MN (US); John C. Dayka, New Paltz, NY (US); Donna N. Dillenberger, Yorktown Heights, NY (US); Richard H. Guski, Red Hook, NY (US); Timothy J. Hahn, Cary, NC (US); Margaret K. LaBelle, Poughkeepsie, NY (US); Mark A. Nelson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1093 days.

This patent is subject to a terminal disclaimer.

(21) Appl. No.: 11/468,139

(22) Filed: Aug. 29, 2006

(65) Prior Publication Data

US 2006/0288228 A1 Dec. 21, 2006

Related U.S. Application Data

(63) Continuation-in-part of application No. 10/099,799, filed on Mar. 15, 2002, now abandoned.

(51) Int. Cl.
*H04L 29/06* (2006.01)
(52) U.S. Cl. ........................ 713/167; 726/27
(58) Field of Classification Search ................ None
See application file for complete search history.

(56) References Cited

U.S. PATENT DOCUMENTS

| | | | |
|---|---|---|---|
| 4,926,476 A | 5/1990 | Covey | |
| 5,276,901 A | 1/1994 | Howell et al. | |
| 5,321,841 A | 6/1994 | East et al. | |

(Continued)

FOREIGN PATENT DOCUMENTS

JP 2003-006165 A 1/2003

OTHER PUBLICATIONS

"Technical Identity Management", NetReference Architecture for Applications Infrastructure, pp. 1-14 (http://wvvw.burgontgroup.com/content/nss/architecutre/tech_positions/Identity/Identity_cont...) (Nov. 8, 2001).
Sahai et al., "Extending ARM for End-to-End Correlation and Optimization of E-service Transactions", HPL-2000-168, Hewlett Packard Laboratories, 8 pgs. (Dec. 11, 2000).

(Continued)

*Primary Examiner*—Pramila Parthasarathy
(74) *Attorney, Agent, or Firm*—William A. Kinnaman; Kevin P. Radigan, Esq.; Heslin Rothenberg Farley & Mesiti P.C.

(57) ABSTRACT

An authenticated identity propagation and translation technique is provided based on a trust relationship between multiple user identification and authentication services resident on different computing components of a multi-component transaction processing computing environment including distributed and mainframe computing components. The technique includes, in one embodiment, forwarding, in association with transaction requests, identified and authenticated user identification and authentication information from a distributed component to a mainframe component, facilitating the selection of the appropriate mainframe user identity with which to execute the mainframe portion of the transaction, and creating the appropriate run-time security context.

20 Claims, 8 Drawing Sheets

U.S. PATENT DOCUMENTS

| | | | |
|---|---|---|---|
| 5,539,906 | A | 7/1996 | Abraham et al. |
| 5,581,765 | A | 12/1996 | Munroe et al. |
| 5,604,490 | A | 2/1997 | Blakely, III et al. .... 340/825.31 |
| 5,699,518 | A | 12/1997 | Held et al. |
| 5,727,145 | A | 3/1998 | Nessett et al. |
| 5,764,745 | A | 6/1998 | Chan et al. |
| 5,764,889 | A | 6/1998 | Ault et al. |
| 5,922,073 | A | 7/1999 | Shimada |
| 5,944,794 | A | 8/1999 | Okamoto et al. |
| 6,023,765 | A | 2/2000 | Kuhn |
| 6,070,243 | A | 5/2000 | See et al. |
| 6,073,106 | A | 6/2000 | Rozen et al. |
| 6,085,188 | A | 7/2000 | Bachmann et al. ............. 707/3 |
| 6,105,131 | A | 8/2000 | Carroll ....................... 713/155 |
| 6,112,186 | A | 8/2000 | Bergh et al. ................... 705/10 |
| 6,141,754 | A | 10/2000 | Choy |
| 6,154,751 | A | 11/2000 | Ault et al. |
| 6,157,953 | A | 12/2000 | Chang et al. ................ 709/225 |
| 6,178,510 | B1 | 1/2001 | O'Connor et al. |
| 6,253,203 | B1 | 6/2001 | O'Flaherty et al. |
| 6,256,031 | B1 | 7/2001 | Meijer et al. |
| 6,275,824 | B1 | 8/2001 | O'Flaherty et al. |
| 6,289,344 | B1 | 9/2001 | Braia et al. |
| 6,295,605 | B1 | 9/2001 | Dockter et al. |
| 6,304,973 | B1 | 10/2001 | Williams |
| 6,310,538 | B1 | 10/2001 | Boucher |
| 6,353,621 | B1 | 3/2002 | Boland et al. |
| 6,360,222 | B1 | 3/2002 | Quinn |
| 6,367,016 | B1 | 4/2002 | Lambert et al. |
| 6,377,994 | B1 | 4/2002 | Ault et al. |
| 6,385,724 | B1 | 5/2002 | Beckman et al. |
| 6,389,542 | B1 | 5/2002 | Flyntz |
| 6,412,070 | B1 | 6/2002 | Van Dyke et al. |
| 6,430,561 | B1 | 8/2002 | Austel et al. |
| 6,574,721 | B1 | 6/2003 | Christenson et al. |
| 6,643,685 | B1 | 11/2003 | Millard |
| 6,684,259 | B1 | 1/2004 | Discavage et al. |
| 6,708,170 | B1 | 3/2004 | Byrne et al. |
| 6,760,780 | B1 | 7/2004 | Chitturi et al. |
| 6,981,043 | B2 | 12/2005 | Botz et al. ................... 709/225 |
| 7,093,298 | B2 | 8/2006 | Rodriquez et al. |
| 7,127,613 | B2 * | 10/2006 | Pabla et al. .................. 713/171 |
| 7,133,842 | B2 * | 11/2006 | Harif ............................. 705/37 |
| 7,134,022 | B2 | 11/2006 | Flyntz |
| 7,302,569 | B2 | 11/2007 | Betz et al. |
| 2001/0047485 | A1 | 11/2001 | Brown et al. |
| 2002/0016184 | A1 | 2/2002 | Helaine et al. ............... 455/533 |
| 2002/0091757 | A1 | 7/2002 | Cuomo et al. ............... 709/203 |
| 2002/0093857 | A1 | 7/2002 | Cole |
| 2002/0133330 | A1 | 9/2002 | Loisey et al. .................. 703/27 |
| 2002/0161840 | A1 | 10/2002 | Wilcox et al. ................ 709/206 |
| 2002/0184504 | A1 | 12/2002 | Hughes ....................... 713/177 |
| 2002/0184507 | A1 | 12/2002 | Makower et al. ............ 713/182 |
| 2003/0055809 | A1 | 3/2003 | Bhat |
| 2003/0158820 | A1 | 8/2003 | Mathur et al. |
| 2003/0177388 | A1 | 9/2003 | Botz et al. ................... 713/201 |
| 2004/0015499 | A1 | 1/2004 | Silverman et al. |
| 2004/0024764 | A1 | 2/2004 | Hsu et al. |
| 2004/0187020 | A1 | 9/2004 | Leerssen et al. |
| 2004/0220947 | A1 | 11/2004 | Aman et al. ................. 707/100 |
| 2004/0225883 | A1 | 11/2004 | Weller et al. |
| 2004/0237093 | A1 | 11/2004 | Sluiman et al. ............. 719/318 |
| 2005/0091655 | A1 | 4/2005 | Probert et al. |
| 2005/0183068 | A1 | 8/2005 | Cwalina et al. ............. 717/128 |
| 2006/0107036 | A1 | 5/2006 | Randle et al. ............... 713/153 |
| 2006/0137021 | A1 | 6/2006 | Bender et al. |

OTHER PUBLICATIONS

Emuchay et al., "Correlating Business Workflows with IT End-to-end Transaction", IBM DOSS: AUS920050545 (2 pgs.) (Aug. 3, 2005).

Roller et al., "User-Defined Audit Trail Records in Workflow Management Systems", IBM RD DE820010192, RD n450 Oct. 2001, Article 106, p. 1741 (4 pgs.) (Oct. 2001).

Roller et al., "Context-controlled Topic-based Publication in Workflow Management Systems", IBM RD DE820010202, RD n450 Oct. 2001, Article 108, p. 1744 (3 pgs.) (Oct. 2001).

Alan Knox, "Merging log files from components of a multi-tier system using TSpaces", IBM RD GB820000120, RD n439 Nov. 2000, Article 111, p. 1995 (2 pgs.).

Office Action from U.S. Appl. No. 11/018,884 (U.S. Patent Publication No. 2006/0137021 A1), dated Aug. 13, 2008.

Office Action from U.S. Appl. No. 11/018,884 (U.S. Patent Publication No. 2006/0137021 A1), dated Dec. 22, 2008.

Office Action from U.S. Appl. No. 11/018,884 (U.S. Patent Publication No. 2006/0137021 A1), dated May 14, 2009.

Office Action from U.S. Appl. No. 10/643,798 (U.S. Patent No. 7,302,569), dated Apr. 6, 2007.

Office Action from U.S. Appl. No. 09/818,064 (U.S. Patent No. 6,981,043), dated Sep. 2, 2004.

Office Action from U.S. Appl. No. 09/818,064 (U.S. Patent No. 6,981,043), dated Apr. 25, 2005.

Office Action from U.S. Appl. No. 10/099,799 (U.S. Patent Publication No. 2003/0177388 A1), dated Aug. 23, 2005.

Office Action from U.S. Appl. No. 10/099,799 (U.S. Patent Publication No. 2003/0177388 A1), dated Jan. 17, 2006.

"Security Server RACF Security Administrator's Guide", IBM Corporation, SA22-7683-05, Sixth Edition (Sep. 2004).

"C++ Run-Time Library Reference", IBM Corporation, SA22-7821-06, Seventh Edition (Sep. 2004).

"Security Server Racroute Macro Reference", IBM Corporation, SA22-7692-06, Seventh Edition (Sep. 2004).

"Security Server (RACF) Introduction", IBM Corporation, GC28-1912-06, Seventh Edition (Sep. 1999).

"z/OS V1R4.0 Security Server RACH Security Administrator's Guide", IBM Corporation, IBM BookManager, Print Preview, SA22-7683-03 (Jun. 28, 2002).

Meyers et al., "Protecting Privacy Using the Decentralized Label Model", ACM Transactions on Software Engineering and Methodology, vol. 9, No. 4, pp. 410-442 (Oct. 2000).

Meyers et al., "Complete, Safe Information Flow with Decentralized Labels", Proceedings of the 1998 IEEE Symposium on Security and Privacy, Oakland, California, pp. 186-197 (May 1998).

Meyers et al., "A Decentralized Model for Information Flow Control", Proceedings of the 16th ACM Symposium on Operating Systems Principles (SOSP), Saint-Malo, France, pp. 129-142 (Oct. 1997).

Fischer-Hubner et al., "From a Formal Privacy Model to its Implementation", Proceedings of the 21st National Information Systems Security Conference, Arlington, Virginia (Oct. 5-8, 1998).

Jajodia, S., "Database Security: Status and Prospects", Center for Secure Information Systems, pp. 1-35 (2003).

Fischer-Hubner, S., "IT Security and Privacy—Design and Use of Privacy-Enhancing Security Mechanisms", Springer Scientific Publishers, Lecture Notes of Computer Science (LNCS 1958), Chapter 4, pp. 167-200 (May 2001).

Araki et al., "An Access Control Mechanism for Object-Oriented Database Systems", IEICE Transactions on Fundamentals of Electronics, Communications and Computer Sciences, vol. E76-A, No. 1, pp. 112-121 (Jan. 1993).

Kormann et al., "Risks of the Passport Single Signon Protocol", Computer Networks, The International Journal of Computer and Telecommunications Networking, vol. 33, Nos. 1-6, pp. 51-58 (Jun. 2000).

"Microsoft Looks to Ease Windows/iSeries Integration", (http://www.iseriesnetwork.com/artarchive/index.cfm?fuseaction+viewarticle&CO_ContentID=19108&cha...), dated Aug. 23, 2004, printed Aug. 31, 2004.

* cited by examiner

AUTHENTICATED IDENTITY PROPAGATION AND TRANSLATION WITHIN A MULTIPLE COMPUTING UNIT ENVIRONMENT

CROSS-REFERENCE TO RELATED APPLICATIONS

This application is a Continuation-In-Part application of pending U.S. application Ser. No. 10/099,799, filed Mar. 15, 2002, entitled "Authenticated Identity Translation Within a Multiple Computing Unit Environment", the entirety of which is hereby incorporated herein by reference. Additionally, this application contains subject matter which is related to the subject matter of the following U.S. Letters Patent, which is assigned to the same assignee as this application and which is also hereby incorporated herein by reference in its entirety:

"Apparatus and Method for Managing Multiple User Identities on a Networked Computer System", by Botz et al., U.S. Pat. No. 6,981,043 B2, issued Dec. 27, 2005.

TECHNICAL FIELD

The present invention relates in general to identification and authentication within a multi-computing unit environment, and more particularly, to a global, authenticated identity translation technique within such a multi-computing unit environment.

BACKGROUND OF THE INVENTION

Multiple application platforms are available in the computing industry today. Examples include AS/400, AIX, and z/OS operating systems (marketed by International Business Machines (IBM) Corporation of Armonk, N.Y.), and Windows 2000 (marketed by Microsoft of Redmond, Wash.). Another example of an application platform is IBM Web-Sphere Application Server, which is a middleware platform for distributed applications that is based on Java and can thus execute on multiple operating system platforms. Large scale computing solutions of today often consist of multiple computing applications, executing on different platforms, that are networked together as set of components that work together cooperatively to form a larger system or environment that addresses a particular business requirement.

Since the requirements of operating systems and middleware application platforms typically differ, each system maintains its own user registry, which includes a list of users and associated information, such as user Ids and passwords, used to authenticate a user when access to the network is requested. A user may be a human user, or may be a software process assigned a local user identity, such as a print server. Each platform typically has its own administrative tools that allow a system administrator to add, delete or modify user identities in the user registry. With a heterogeneous network that has several different operating systems, this means that the system administrator must learn and become proficient in several different tools which handle identity management in their respective realms (e.g., platforms).

In view of the above, a need exists in the art for a novel approach to authenticated identity propagation and translation within a multi-component transaction processing environment to, for example, facilitate run-time inter-operation between components that are employing disparate security and user registry services, and to do so with performance characteristics and within programming model constraints that are suitable for use in the mainframe components of the environment

SUMMARY OF THE INVENTION

The shortcomings of the prior art are overcome and additional advantages are provided through the provision of an authenticated identity propagation and translation method implemented via one or more computer programs executing at one or more computing components of a multi-component transaction processing environment. The method includes: establishing an authenticated client-user identity at a distributed component of a multi-component transaction processing environment, the multi-component transaction processing environment further including at least one mainframe component, the distributed component and the at least one mainframe component employing security services with disparate user registries and different user identities for the client user, and wherein the security services of the distributed component and the at least one mainframe component have a security trust relationship established therebetween and are coupled together via a secure networking function; responsive to an initiated transaction request by the authenticated client-user at the distributed component requiring processing of a further transaction request at the at least one mainframe component, constructing a distributed security information message at the distributed component, the distributed security information message including an identity of the distributed component as known at the at least one mainframe component, and the authenticated client-user identity as known at the distributed component, and appending the distributed security information message to the further transaction request for forwarding from the distributed component to the at least one mainframe component; validating the distributed security information message at the at least one mainframe component, and once validated, mapping at the at least one mainframe component the authenticated client-user identity of the client-user at the distributed component to a local mainframe identity employing the distributed security information message, and creating a local authenticated runtime security context representative of the local mainframe identity and the authenticated client-user identity for execution of the further transaction request at the at least one mainframe component; and further employing the distributed security message information at the at least one mainframe component when creating an audit record representative of execution of the further transaction request at the at least one mainframe component to associate the authenticated client-user identity at the distributed component therewith, wherein audit records of the at least one mainframe component can be employed in tracking execution of the further transaction request at the at least one mainframe component, and hence, tracking processing of the initiated transaction request of the client-user within the multi-component transaction processing environment.

In an enhanced aspect, the method further includes, responsive to receiving the further transaction request and the associated distributed security information message at the at least one mainframe component, determining whether a local authenticated runtime security context concurrently cached for the client-user initiating the transaction request at the distributed component, and if so, employing the existing local authenticated runtime security context in executing the further transaction request at the at least one mainframe component. In another aspect, constructing the distributed security information message further includes establishing a cryptographic hash of a payload of the distributed security information message using a secret key shared between security services of the distributed component and the at least one mainframe component, and forwarding the cryptographic hash with the distributed security information message to the at least one mainframe component, and wherein the determining further includes employing the cryptographic hash as a key at the at least one mainframe component to determine whether the local authenticated runtime security context already exists in cache of the at least one mainframe component for the client-user of the distributed component.

Systems and computer program storage devices corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
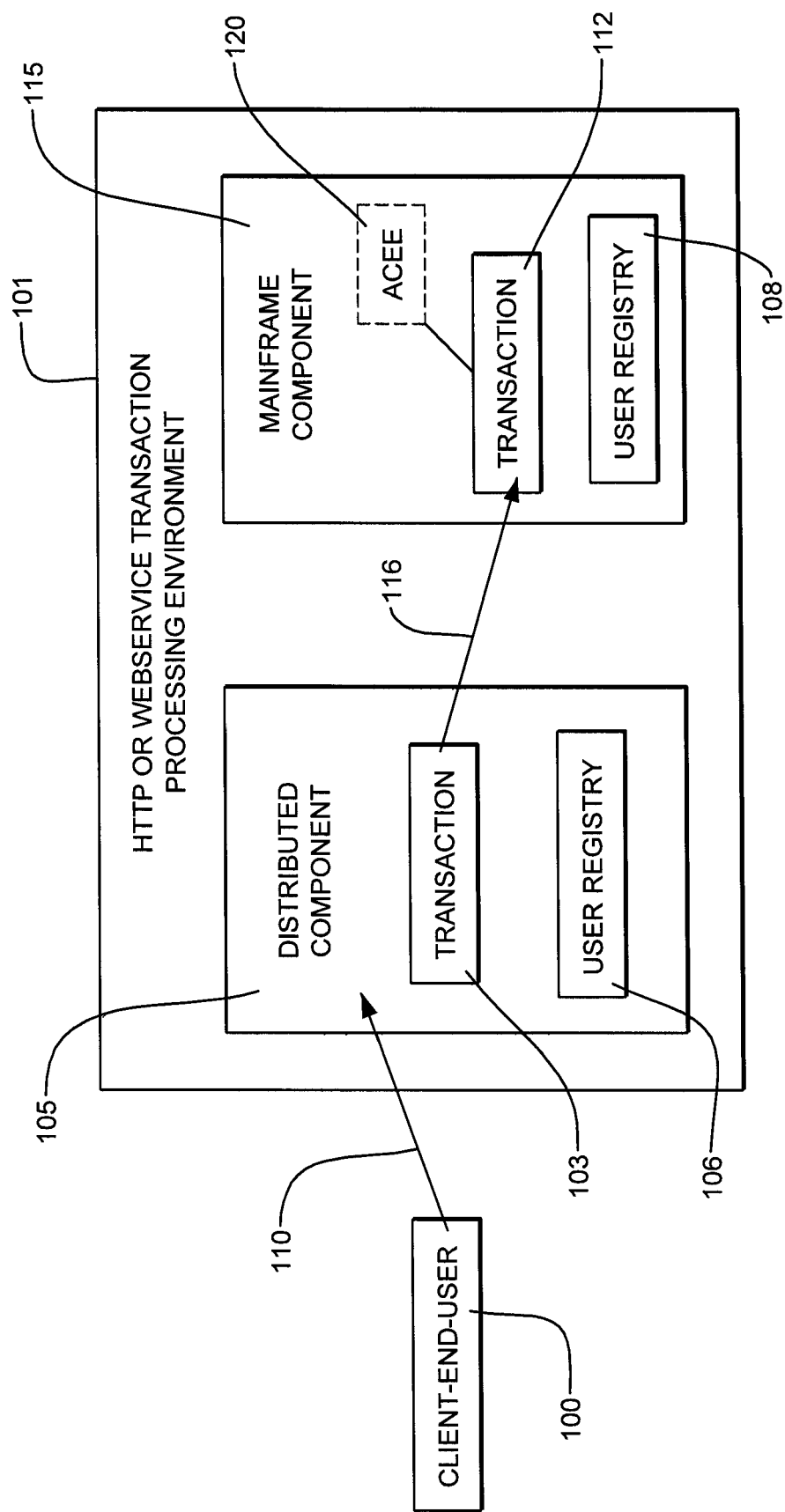
FIG. 1 depicts one example of a multi-component transaction-processing environment illustrating a problem addressed by one or more aspects of the present invention.

In accordance with one or more aspects of the present invention, a method of propagating client-end-user identification and authentication information from a distributed component of a multi-component transaction processing environment to a mainframe component of such an environment is provided. The method facilitates client-end-user identification and authentication (signing on) within a distributed component of a multi-component (distributed and mainframe) transaction processing computing environment employing disparate user registries; and includes dynamically translating an authenticated user identity as known on a distributed component of said environment into an associated local identity on at least one mainframe component of the transaction processing computing environment.

A specific example of a multi-component environment wherein components work together cooperatively to form a larger system is the IBM HyperText Transfer Protocol (HTTP) and Web-Services processing environment, as often implemented by IBM customers using IBM mainframe computers, such as the IBM z9-109 family of computing machines. This environment typically includes IBM's WebSphere Application Server (WAS) middleware platform software product working in conjunction with one or more of IBM's transaction processing products like IBM Customer Information Control System (CICS) and/or IBM Information Management System (IMS), IBM's message processing product IBM Message and Queing (MQ), and IBM's relational data base product IBM Data Base 2 (DB2).

The objective of this example of a multi-component environment is to provide a high performance transaction processing computing system or environment accessible to client-end-users via Internet browsers (such as Windows Internet Explorer or Mozilla Firefox) using the HTTP networking protocol, or via other Web Services. In this environment, IBM WebSphere Application Server (WAS) is the component in the environment that is directly communicating with the client-end-user who is making the HTTP or Web-Services request. For discussion clarity, in this disclosure, we refer to the WAS component within this environment as the 'distributed' component of the environment.

Typically, in order to fulfill the transaction request from the distributed client-end-user, WAS must invoke the services of one or more other components in the environment such as CICS, IMS, MQ, or DB2. These components typically execute on the z/OS operating system, which is often referred to as the IBM 'mainframe' operating system platform. For this reason, and again for discussion clarity, these software products are referred to herein as the 'mainframe' components of the multi-component distributed transaction processing environment.

In such an environment, the IBM transaction processing, messaging, and data base components typically are executing within an IBM mainframe computer which uses the IBM Resource Access Control Facility (RACF), including RACF's user registry, as its 'security engine'. WAS, on the other hand, may or may not be executing on the same IBM mainframe computer, since it could be executing on a different computer with a different security engine and user registry while interacting with the other components in the environment via authenticated and secure networking connections. In either case, the client-end-user is identified and authenticated to WAS using a 'distributed' security engine and user registry, such as Windows Active Directory. The run-time security context that WAS uses for processing the WAS portion of the overall transaction request contains the identity of the user in its distributed form, and not the identity of the user as it would be represented within the RACF security engine and user registry. Further, the run-time security context that the mainframe transaction processing, messaging, and data base components require for processing will need to represent the client-end-user as a user identity in RACF form, which is typically different from the identity of the user in distributed form.

Sometimes, security engine function, including the registry of end-users, may be common to some subset of the components of the multi-component environment but not all of them. For example, often platforms will have their own administrative tools that allow a system administrator to add, delete, or modify user identities in the end-user registry. This means that the system administrator must learn and become proficient in several different tools, which handle identity management. Although the administrative aspects of the multi-component transaction processing environment are important, they are not the focus of this invention, as they are dealt with in acceptable fashion by multiple registry user provisioning strategies and products like IBM Tivoli Identity Manager and IBM Tivoli Directory Integrator. Instead, the problems that this invention addresses and therefore the focus of this invention involve the run-time security aspects of this multi-component environment.

The focus of the present invention is the environmental reality that some components and client-end-users of the multi-component environment may be known in, and authenticated by, a distributed security engine and registry, while subsequently executing transactions (or causing them to be executed) within a mainframe component of the environment, which is executing under the security control of the mainframe security engine and user registry, for example IBM RACF.

More specifically, one problem addressed by the teachings of this invention is the flowing-through or 'propagation' of a client-user-identity that has been identified and authenticated in a distributed component (like WAS) of the multiple component transaction processing environment, to a mainframe component of the same environment, and appropriately translated to a customer selected mainframe user identity, for execution of the mainframe component of the overall transaction, without the need for the client-end-user to have to re-authenticate or even be aware of his/or her mainframe user identity or that this process is in affect.

Further, today there is no logical mechanism in place, or available as a design option (because of performance and programming model restrictions) appropriate for the described multi-component transaction processing environment, to translate from the distributed run-time representation of the client-end-user identity to the mainframe run-time representation of the user's identity, or to include the user's distributed identity in run-time audit records created by the mainframe (as described herein). Because of this, IBM customers typically have no choice but to configure WAS so as to cause the execution of the mainframe components, of all distributed transaction requests, under a single, essentially 'hard-coded', mainframe identity, thereby losing the potential for auditing and access control at the granularity of the identity of client-end-user. This condition is recognized as a long standing goal within the industry for so called 'end-to-end' auditing of transactions of distributed origin that process in such environments.

Thus, presented herein, in one aspect, is an authenticated identity propagation and translation method which includes: establishing an authenticated user identity responsive to an identification and authentication event within an environment comprising a component within the environment where user identification and authentication occurs based on the user's administratively assigned distributed identity and a subsequent component where further processing occurs based on the user's administratively assigned mainframe identity, the distributed component and the subsequent mainframe component employing disparate user registries with perhaps different user identity character strings representing the same physical client-end-user; forwarding the identified and authenticated distributed identity from the distributed component to the mainframe component; and facilitating the translation of the authenticated user identity within the distributed component to a local user identity within the mainframe component, utilizing for example an existing mainframe user identity translation component such as IBM's Enterprise Identity Mapping (EIM), the technology of which is disclosed in the above-incorporated U.S. Pat. No. 6,981, 043, or alternatively the identity mapping function within the existing mainframe security engine RACF.

In an enhanced aspect, the present invention further includes a scratch-pad computer memory or storage area that is securely accessible to both the distributed component in the previously described transaction processing environment and the mainframe component or components within the environment. The purpose of the shared scratch-pad area is to facilitate propagation of the client-end-user's identity when there is insufficient data bandwidth in the existing communication protocol in use between the distributed and mainframe components to include the distributed user identity information, which would consist of minimally the user's distributed identity and the identity of the security engine and registry the user is defined within.

In this case, the distributed user identity information is written temporarily to the secure shared scratch pad; a small reference token is created by the scratch-pad logical mechanism which is passed by the distributed component to the mainframe component through the space limited protocol, and used by the mainframe component to retrieve the distributed user information from the shared scratch-pad area. The mainframe component can then map the distributed user identity into the local mainframe identity as described previously.

Aspects of the present invention advantageously support application run-time inter-operation between disparate security registry services which employ different forms of user identification and authentication. In accordance with the authenticated identity propagation and translation technique disclosed herein, an exploiter of the function does not have to know which target system or systems a further request will be forwarded to in a multi-component transaction processing environment.

Further, using the present technique, user passwords exist only inside the protection offered by the security engine and user registry whereby a client-end-user initially authenticates, which is the distributed component of the overall environment, thereby facilitating administration of the system and ease of use for the client-end-user as the user need only identity and authenticate once to the entire transaction processing environment.

The problem addressed by the authenticated identity translation technique disclosed herein is explained more below with reference to FIGS. 1 & 2.

FIG. 1 depicts a multi-component transaction processing environment 101, including a distributed component 105 employing a local user registry 106, and a mainframe component 115 employing a local user registry 108.

In the example of FIG. 1, the distributed component and the mainframe component are assumed to be built on disparate platforms, with local user registries 106 and 108 being distinct. A user 100 is identified and authenticated 110 via, for example, Secure Sockets Layer (SSL) protocol, on the distributed component 105 of the multi-component transaction-processing environment using a corresponding user identity from user registry 106. Once identified and authenticated, the user may request 110 a transaction or function 103, of the distributed component of the overall transaction-processing environment that, as part of its processing, requests 116 another transaction or function 112 of the mainframe component 115 of the transaction-processing environment. Typically, this transaction or function will need to execute using an identity known within the user registry of the mainframe component of the transaction-processing environment. The problem is how to securely propagate the client-end-user identity, known within the distributed component, to the mainframe component, and to establish an identified and authenticated client-end-user run-time security context with the appropriate mainframe user identity.

Note that the purpose of the run-time-security context is to provide processing thread availability to the operating system and the application of the client-end-user identity, as it is known on the mainframe, for resource access control and auditing purposes. An example of a run-time identity context is the z/OS data area control block commonly known in the industry as the Accessor Environment Element or ACEE 120. Those familiar with the art will appreciate that this problem is not addressed by distributed approaches to similar appearing problems that are addressed by solutions involving federated identity servers and browser cookies.

Although "single-signon" products addressing some aspects of this problem exist, such as Tivoli Global Sign-On (offered by Tivoli Systems Inc., an International Business Machines Company), such products are based on a product specific "mapping file" that contains at some initial authentication server, a particular user's ID and password on some potential "target" server, platform or application. A current approach taken by these "single-signon" products is described below with reference to FIG. 2.

Figure 2:
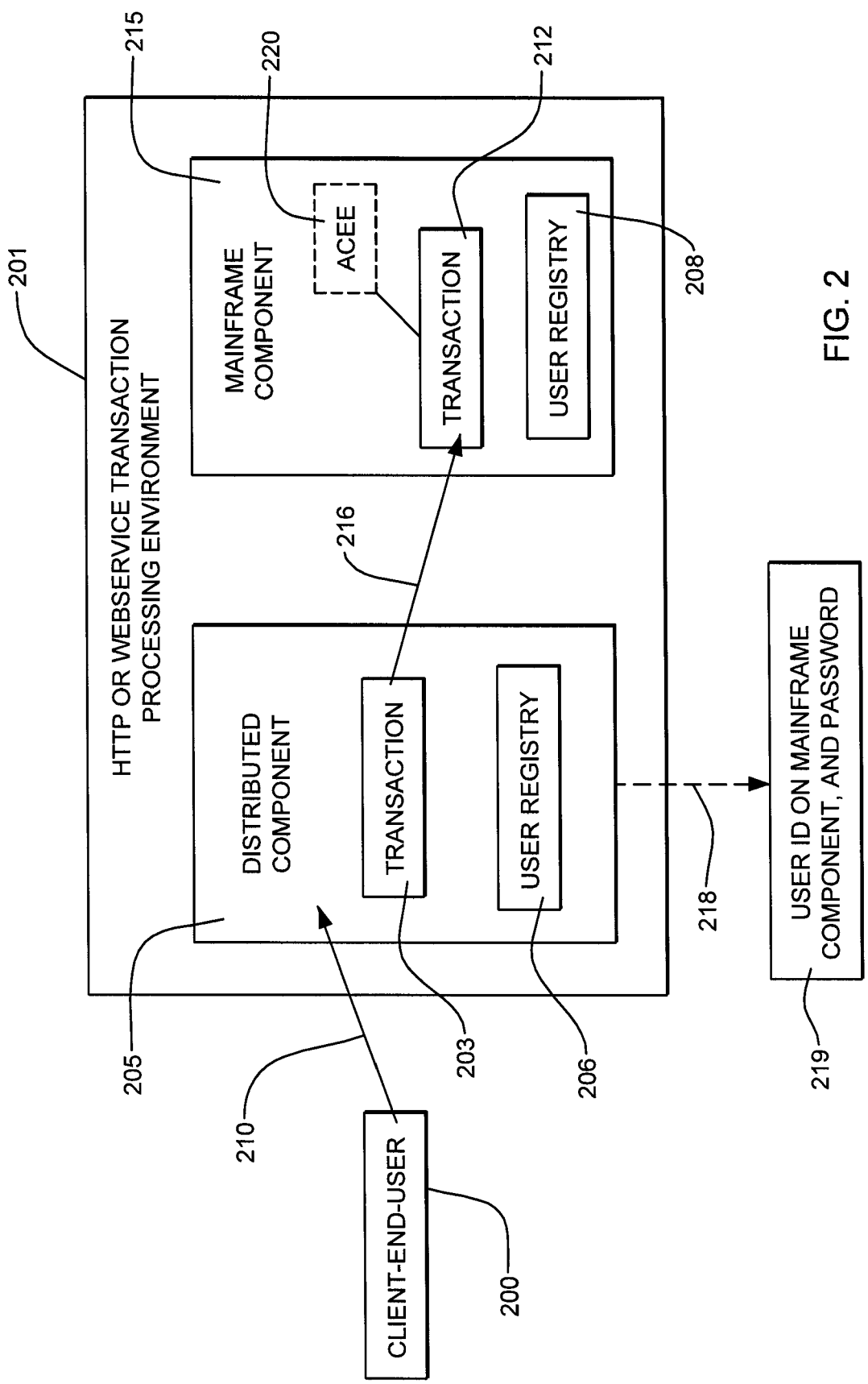
FIG. 2 depicts one example of one possible solution to the problem illustrated by FIG. 1.

The system of FIG. 2 includes a distributed component 205 of a multi-component transaction-processing environment 201 using a local user registry 206, a mainframe component 215 of a multi-component transaction-processing environment using a local user registry 208, and a side file 219 containing user IDs and passwords for the mainframe component user registry. Similar to the example of FIG. 1, the distributed component and the mainframe component of the multi-component transaction-processing environment are assumed to be built on different platforms, with disparate user registries 206, 208. A user 200 is identified and authenticated 210 at the distributed component using a corresponding user identity from user registry 206. Should a transaction 203 of distributed component 205 wish to forward a request 216 to the mainframe component 215, a user ID and password for the mainframe component 215 is obtained 218 from side file 219 and is included with the request 216. The mainframe component 215 then signs the user on like any other local request.

The application-owned mapping file approach described above leads to the following set of problems. First, mapping file entries are "target system based", meaning that the caller of the service needs to know the target system(s). Also, the mapping file entry for a particular target platform, application, or middle-ware security service should contain an authenticator for the user in order to affect a "sign-on" for the user at the target unit. Usually the authenticator is the user's password, leading to administrative problems since passwords change from time to time, as well as to security concerns because the user's password would exist outside the protection offered by the local user registry such as one-way encryption of the password.

Those familiar with the art will further recognize that a password for the mainframe identity of the client-end-user must be kept in a side file accessible to the distributed component of the transaction-processing environment. Since the mainframe user's password must also be kept within the mainframe user registry, the password is in two locations. Such an arrangement is problematic for security reasons as well as operational reasons, in that if the user's password is changed in either of the locations, it must be changed in the other at the same time (which is often not possible) or authentication events will fail for events initiated during the period no matter how short when the two registries are out of sync. For this reason, and others, this arrangement is believed unacceptable for the multi-component transaction-processing environment described above.

Further, since there are multiple single-signon products implementing similar functions in applications and middleware today, multiple different and non-compatible mapping file implementations exist which inhibit using disparate computing resources as an inter-operable set. Moreover, the target platform, application, or middle-ware security service has no way of distinguishing a sign-on that comes to it from another platform, application, or middle-ware security service that has already accomplished the identification and authentication, from any other sign-on request be it local or remote. That is, from the perspective of the target platform, application, or middle-ware security service the "history" is lost. Still further, there is no general method or protocol for managing the security state of a transaction that is in transit. That is, once a request has been forwarded, and because the history is lost, there is currently no way to recognize that the request is the result of a specific earlier distributed request event so that the resulting request(s) can be easily stopped from being forwarded again and again, even though the user may have been revoked from the original, local user registry.

Taken together, these problems make distributed component applications that fan to multiple disparate mainframe components, or which multi-hop to multiple mainframe components, or combinations of these cases, unfeasibly problematic to implement using the approach of FIG. 2. This situation is a principle inhibitor to the development of distributed applications, which might otherwise be designed to exploit multi-platform, multi-component computing resources, as if the resources were a single inter-operating set, especially from a security perspective.

One way to solve this problem is to force all applications and operating systems to share a common user registry. This approach may be viable in a homogenous environment, i.e., in a network that only has computers of the same platform type. However, implementing this approach on a heterogeneous network that includes several different components executing within several different operating systems would require that each operating system and each application be re-written to access some common user registry, rather than its local user registry. This is simply not a workable solution.

Prior to describing detailed embodiments of the present invention, the following definitions are presented for use herein:

Multi-component transaction-processing environment: A transaction-processing system or environment comprising distributed and mainframe components, working cooperatively to respond to for example HTTP and Web-Service client-end-user service or transaction requests.

Distributed Component: A component of a larger multi-component transaction-processing environment comprising at least a computer, operating system platform, applications, networking and an associated security engine that provides distributed transaction processing functions such as networking interactions with the client-end-user and identification and authentication functions in HTTP and Web Services scenarios. Typically but not always, a distributed component will execute on an AIX, Windows or Linux OS platform. An example of a distributed component as defined here is the IBM WebSphere Application Server (WAS).

Mainframe Component: A component of a larger multi-component transaction-processing environment including at least a computer, operating system platform, applications, networking and associated security engine that provides high performance back-end transaction processing and large data base functionality, in for example HTTP and WebServices scenarios involving a distributed component as previously described.

Component Trust Domain: A set of transaction processing components that are coupled together via secure networking functions such as Secure Sockets Layer (SSL) or Virtual Private Networking (VPN), such that messages containing user identifications and other sensitive transaction data can flow between components while maintaining data confidentially and integrity.

Initial Authentication Component: A particular component within a component trust domain where a user first identifies and authenticates using the security services locally available to the component. Typically, this component is a distributed component of a multi-component transaction-processing environment as previously described.

Subsequent processing component: A particular component within a component trust domain as previously defined, other than the initial authentication component, where additional, perhaps primary, processing of a client-end-user's transaction request, occurs. Typically, this component is a mainframe component of a multi-component transaction-processing environment as previously described.

Distributed Security Information: A collection of information that includes, but may not be limited to, the identity of the client-end-user in distributed form (for example the client-end-user's Windows Active Directory user identity), the distributed user security engine and registry where the client-end-user is defined and by which the user was identified and authenticated (for example, the network name of the Windows Active Directory).

Authenticated identity propagation: A set of methods and services providing an infrastructure to support run-time client-end-user identity cooperation between components of a multi-component transaction-processing environment.

Enterprise Identity Mapping (EIM): A set of computing services that maintain and make available information detailing an enterprise user's individual identity names in multiple security user registries of multiple computer platforms, applications or middle-ware. The enterprise identity mapping (EIM), which is described in the above-incorporated patent application entitled "Apparatus and Method for Managing Multiple User Identities On A Networked Computer System", may be implemented on top of Lightweight Directory Access Protocol (LDAP). Note that EIM is separate from the concepts of the present invention, although in one embodiment of an environment using aspects of the present invention, the exploitation of EIM is facilitated, and the inclusion of EIM provides usability advantages in the solution presented.

Figure 3:
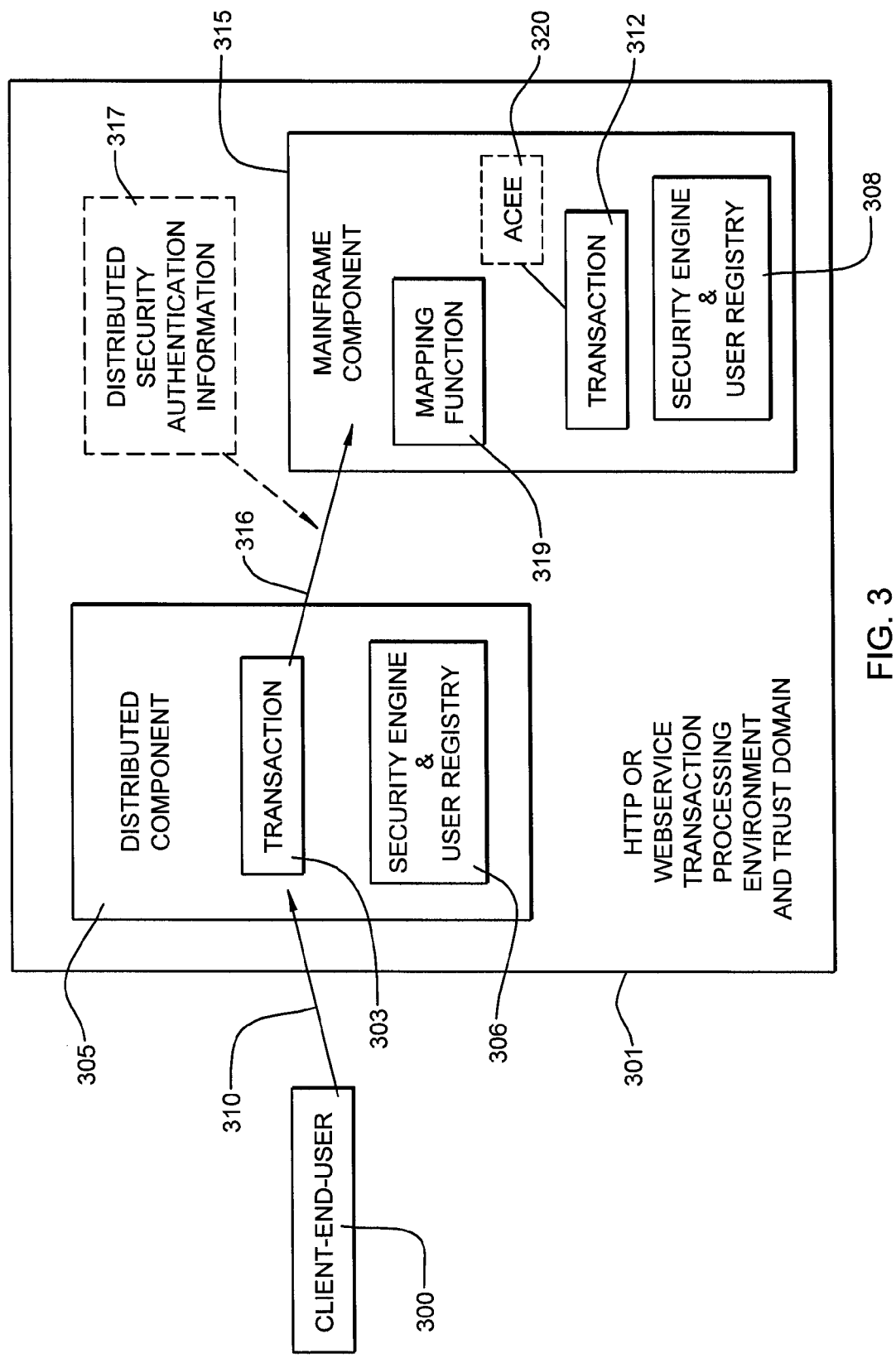
FIG. 3 depicts one implementation of a multiple component transaction-processing environment including both distributed and mainframe computing components, incorporating and using certain identity propagation and translation capabilities, in accordance with an aspect of the present invention.

One embodiment of a computing environment incorporating and using aspects of the present invention is shown in FIG. 3. This environment includes an initial authentication component 305 and a subsequent mainframe processing component 315. Each component includes its own security engine and user registry 306, 308. A user registry (also referred to herein as a local user registry or security registry) contains information on users having access to the respective component, such as user IDs and passwords. In one example, the initial authentication component may be a WebSphere Application Server (WAS), running on a Linux operating system, running within a Logical Partition (LPAR) within a z9-109 computer (offered by International Business Machines Corporation (IBM)) and the subsequent processing component may be an implementation of Customer Information Control System (CICS), which is also offered by IBM, running within a z/OS operating system, executing on the same or perhaps a different z9-109 computer. z/OS is an operating systems offered by International Business Machines Corporation.

The initial authentication server includes an identification and authentication component or service to identify and authenticate a client-end-user 300. In one embodiment, identification and authentication is accomplished by way of the operating system, for instance, implementing an appropriate plug-able authentication module in a Linux environment. In another embodiment, the client-end-user identification and authentication is accomplished by client-authenticated SSL in which the client-end-user has a digital certificate signed by a certificate authority that is trusted by the authenticating distributed component.

Figure 7:
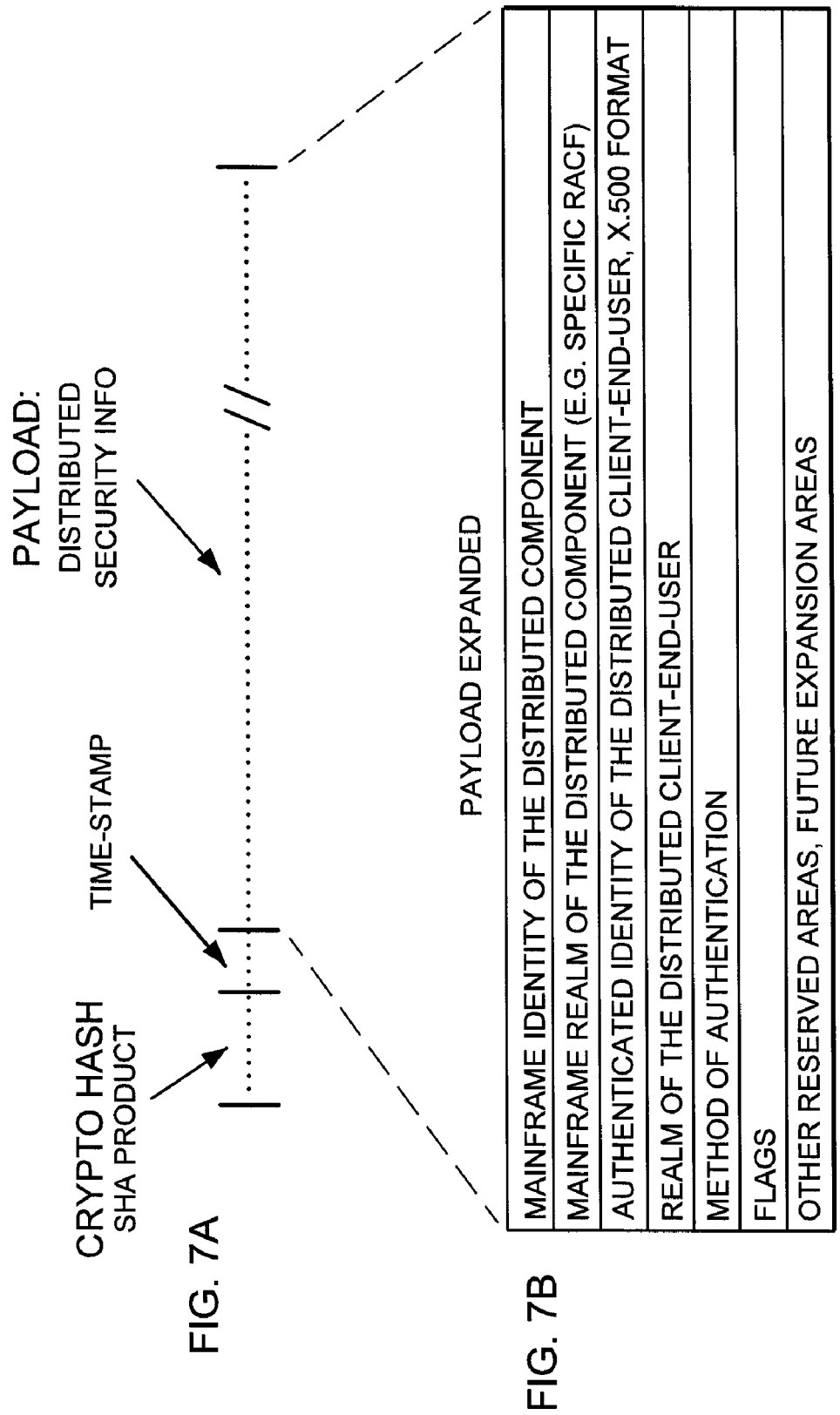
FIGS. 7A & 7B depict one embodiment of a distributed security information message part derived from an identification and authentication event and used to identify a user for a subsequent transaction request forwarded to a mainframe component, in accordance with an aspect of the present invention.

A trust relationship is established between the initial authentication component and the security engine of the subsequent processing component. The trust relationship is based on the secure exchange of a secret cryptographic data signature key, that is used to validate distributed client-end-user identities and other information transferred within the distributed security information transaction processing message part, as depicted in FIGS. 7A & 7B (and described below), as aspects of the present invention. The actual secure exchange is ancillary to this invention, since multiple methods of accomplishing this are well documented in the art, and in general use within the industry. A workable example follows.

The initial authentication component acquires a digital certificate as part of its installation processing, using for example the Simple Certificate Enrollment Protocol (SCEP), which is supported by the Public Key Infrastructure function within the IBM z/OS operating system. As part of its initialization processing, the initial authentication component 305 establishes a client authenticated SSL session with the mainframe security engine 308 of the mainframe component 315 of the transaction-processing environment. During this 'initialization session' the initial authentication component will 'register' itself as a user with the mainframe security engine and have its credentials, including the shared secret data signature key, recorded within the mainframe security engine (e.g., RACF) user registry of the mainframe security engine within the 'key rings' that the mainframe security engine retains for selected users, thus establishing the trust relationship.

This trust relationship means that among security user identification and authentication services used by the distributed and mainframe components, a user identification and authentication performed within one component is understood and trusted by another component within the multi-component transaction processing environment. This security trust relationship is also referred to herein as a trust domain, with domain 301 being one example.

In accordance with one or more aspects of the present invention, trust domain 301 is established to include initial authentication component 305, and at least one subsequent processing component 315.

In operation, transaction 303 running within the distributed component 305 of the multi-component transaction processing environment 301, as part of its processing, initiates a subsequent transaction request 316 to the mainframe component of the same environment. Further in accordance with this invention, distributed component 305 includes distributed security authentication information 317, in the transaction request message flow to mainframe component 315.

One embodiment of the distributed security information message (also referred to herein as the "distributed security authentication information") is depicted in FIGS. 7A and 7B. FIG. 7A is an overview of the distributed security information message data structure and FIG. 7B is a detailed example of the security 'payload' of the message. The distributed security information is referred to herein as a 'message part' because in practice, the message part is associated, by the distributed component of the environment, with a transaction request message that flows between components of the described environment.

As depicted in the overview of FIG. 7A, the message part includes a cryptographic hash of the payload of the message part, a time-stamp (the purpose of which is described further below), and the payload.

As depicted in FIG. 7B, the payload includes (in one embodiment): the mainframe identity of the distributed component, the mainframe security manager 'realm' in which the distributed component is defined (and therefore recognized as trust-worthy), the authenticated identity of the distributed user in distributed form, for example, X.500 form ('X.500' is a standard well known in the industry that is part of the Open System Interconnection protocol), the security realm of the distributed client-end-user, and an indicator of the method by which the client-end-user was identified and authenticated by the distributed component (for example, by Kerberos Ticket, or Digital Certificate, or other means). In addition, the payload may contain flags for various purposes and areas reserved for future use.

Mainframe component 315 receives distributed security authentication information 317, along with subsequent transaction request 316, and utilizes an installation administratively defined mapping function 319 to determine what local mainframe component user identity with which to execute subsequent transaction 312. Note that the mapping function utilized may be as simple as a programming coded table associating a given distributed client-end-user with a specific mainframe user identity, or it may be a more administratively friendly and functional program product such as the IBM Enterprise Identity Mapping (EIM) product. In either case, the actual mapping function employed is not unique to the present invention.

Figure 5:
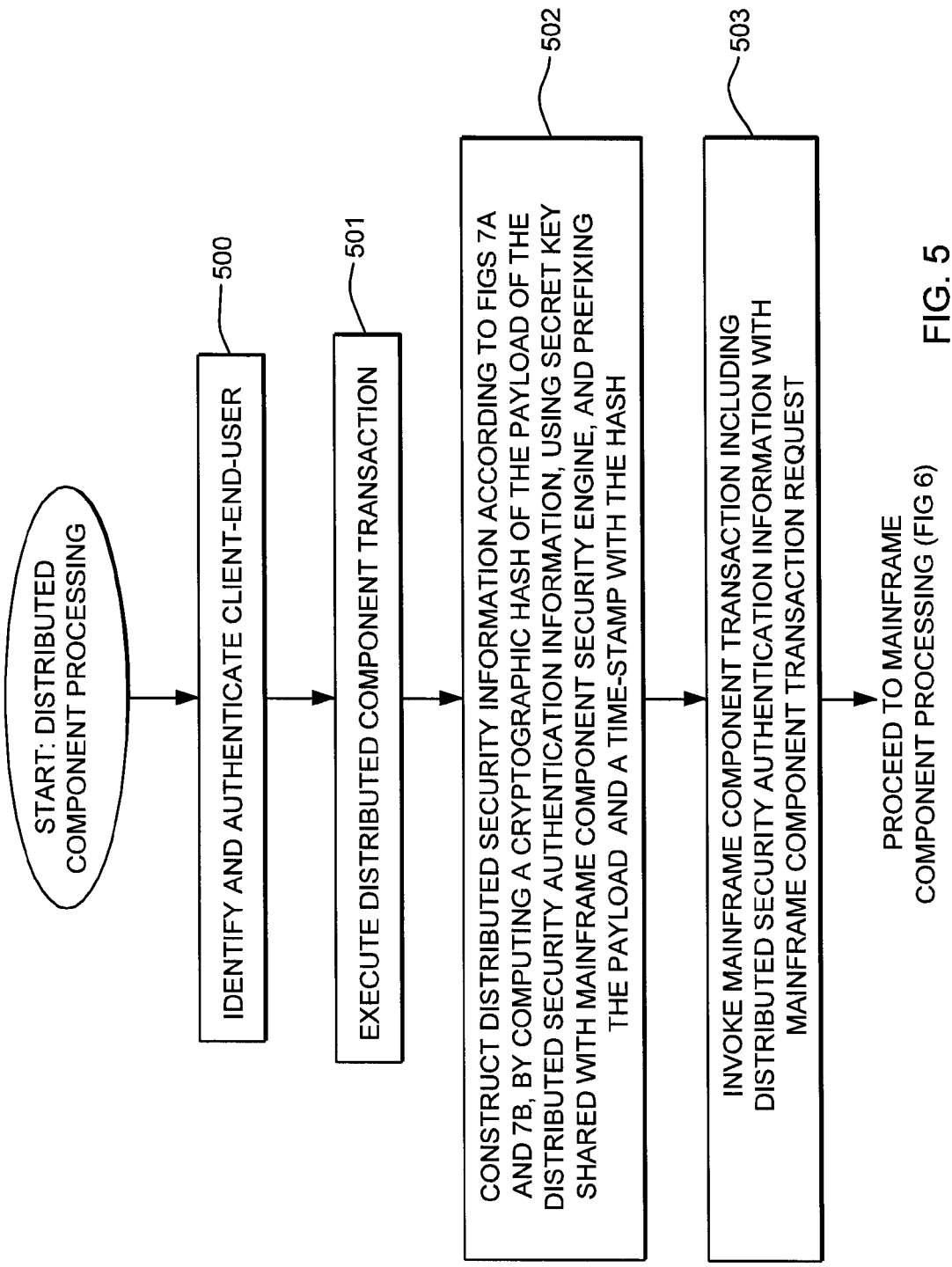
FIG. 5 is one example of distributed component logic employed in constructing a signed distributed security information transaction request message part, in accordance with an aspect of the present invention.

Authenticated identity propagation and translation processing in accordance with an aspect of the present invention is described further below with reference to FIG. 5.

Initially, a client-end user invokes an HTTP or Web Services request running within a distributed component of a multi-component transaction processing environment. The user's credentials, e.g., user ID and password, are verified in the local user registry, and if accepted, the user is identified and authenticated at the distributed component of the multi-component transaction-processing environment 500. In one example, identification and authentication could be accomplished over a 128 bit SSL connection between the user and server. In another example, the user could be identified and authenticated using Kerberos (i.e., a network authentication protocol available from Massachusetts Institute of Technology).

The initial authentication server could be running a UNIX-based operating system, and have a plug-able authentication module (PAM) interface. In such an embodiment, the application or middle-ware of the server could invoke the PAM interface to authenticate the user. In another embodiment, the application or middle-ware could invoke any conventional built-in identification and authentication technology to authenticate the user.

Once identification and authentication has been achieved employing the client-end-user's distributed identity and realm (registry and security engine where the client-end-user is known and authenticated), the distributed component of the transaction request is executed 501. Along with any other processing that the distributed component may contribute to the completion of the overall request, the distributed component determines if any mainframe components of the transaction are required to complete the request.

When the distributed component of the overall transaction determines that a mainframe component transaction is required to complete the request, the distributed component invokes a request 502 to the mainframe component for it to execute the mainframe transaction, and includes with the request the distributed security information, including (in one embodiment) the distributed user identity and realm of the client-end-user, the mainframe identity of the distributed initial authentication component, a time-stamp obtained by the distributed transaction from the distributed component, and the method by which the authentication occurred, e.g. Windows Active Directory. See FIGS. 7A & 7B. These values compose the 'payload' of the distributed security information, and the payload is now digitally signed by using an industry standard technique such as the well known Secured Hash Algorithm (SHA), while temporarily prefixing (while the hash is being computed) the payload with a 'salt' derived from the shared secret key that was exchanged with the mainframe component of the transaction-processing environment earlier during initialization of the distributed component.

The transaction request message is appended with the distributed security information message part then sent 503 via secure message protocol to the mainframe component of the multi-component transaction-processing environment.

Figure 6:
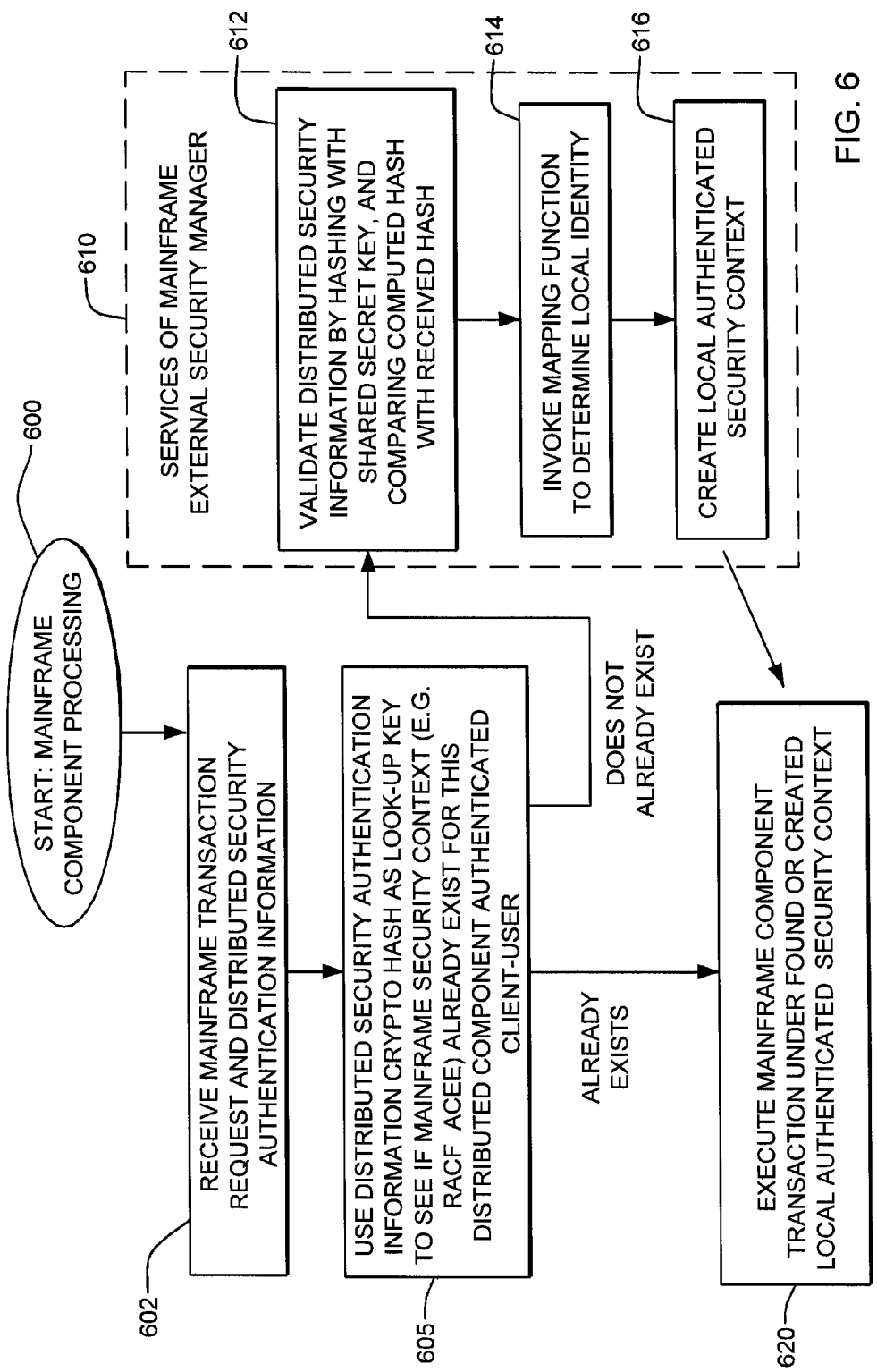
FIG. 6 is one example of mainframe component logic employed in obtaining a distributed security information message part, and using it to determine an appropriate local mainframe user identity with which to associate and execute the associated, requested transaction, in accordance with an aspect of the present invention.

As shown in FIG. 6, the mainframe component of the multi-component transaction-processing environment receives the transaction request message 602, and then uses the crypto-hash (or signature) of the distributed security information as a look-up key within its local cache of run-time security contexts 605, e.g. RACF ACEE, to see if it has already processed and retained in its cache a copy of the run-time security context.

If so (i.e., a valid context exists in the local cache as confirmed by a synonym check, which eliminates the possibility of a hash collision), the mainframe transaction-processing component associates the context with the thread of execution assigned to this particular transaction-processing request, and executes the transaction 620.

If on the other hand, a valid context is not found, using the crypto hash as the look-up key in the local cache, the mainframe component of the transaction-processing environment invokes the services of the mainframe External Security Manager, e.g. RACF, to: validate the distributed security information 612, invoke a mapping function 614 (for example EIM or existing RACF mapping function such as RACF Certificate Name Filtering) to determine the appropriate mainframe user identity for the execution of the transaction, then creates 616 the run-time authenticated user identity security context which is returned to the mainframe component of the transaction-processing environment, where the context is associated with the execution thread assigned to the processing of the transaction, placed in the cache using the crypto-hash as the look-up key, and the transaction is executed 620. An example of a z/OS mainframe transaction-processing application is the IBM Customer Information Control System (CICS).

The requested transaction within the mainframe component is executed 620 under (i.e., in association with) the appropriate local identity as represented by the run-time security context that has been associated with the thread of execution of the transaction, as described, and any audit records created during the execution of the transaction or its invocation will include the distributed security information as well as the local identity used.

From FIG. 6, it can be seen that a local cache of ACEEs can be kept for a reasonable period of time by the mainframe component. This cache is anchored using the crypto-hash of the payload, which describes, for security purposes, the particular client-end-user. Using the crypto-hash, for, or to derive, the anchor eliminates the need to compute another hash, thus saving on processing overhead. Those skilled in the art will recognize that the term 'anchor' refers to the look-up key used to find a particular entry in a multi-entry cache of logical items. In this manner both multiple identity mappings and multiple ACEE creations are avoided for the same client-end-user submitting multiple transaction requests within the same relatively short interval of time. Although logical hashing and caching of ACEEs are not novel to this invention, using the distributed security information in either direct or hashed form as the anchor for each of the cached ACEEs is an aspect of this invention.

Those familiar with the art will appreciate that the process described herein, when practiced within an environment as described or a similar environment, will securely accomplish the objectives of identity propagation and translation, as described, with a minimum of additional computer processing overhead such as machine cycles and use of system memory and storage. These qualities are aspects of the present invention, and are not found in other examples of similar security processing known within the art.

Figure 4:
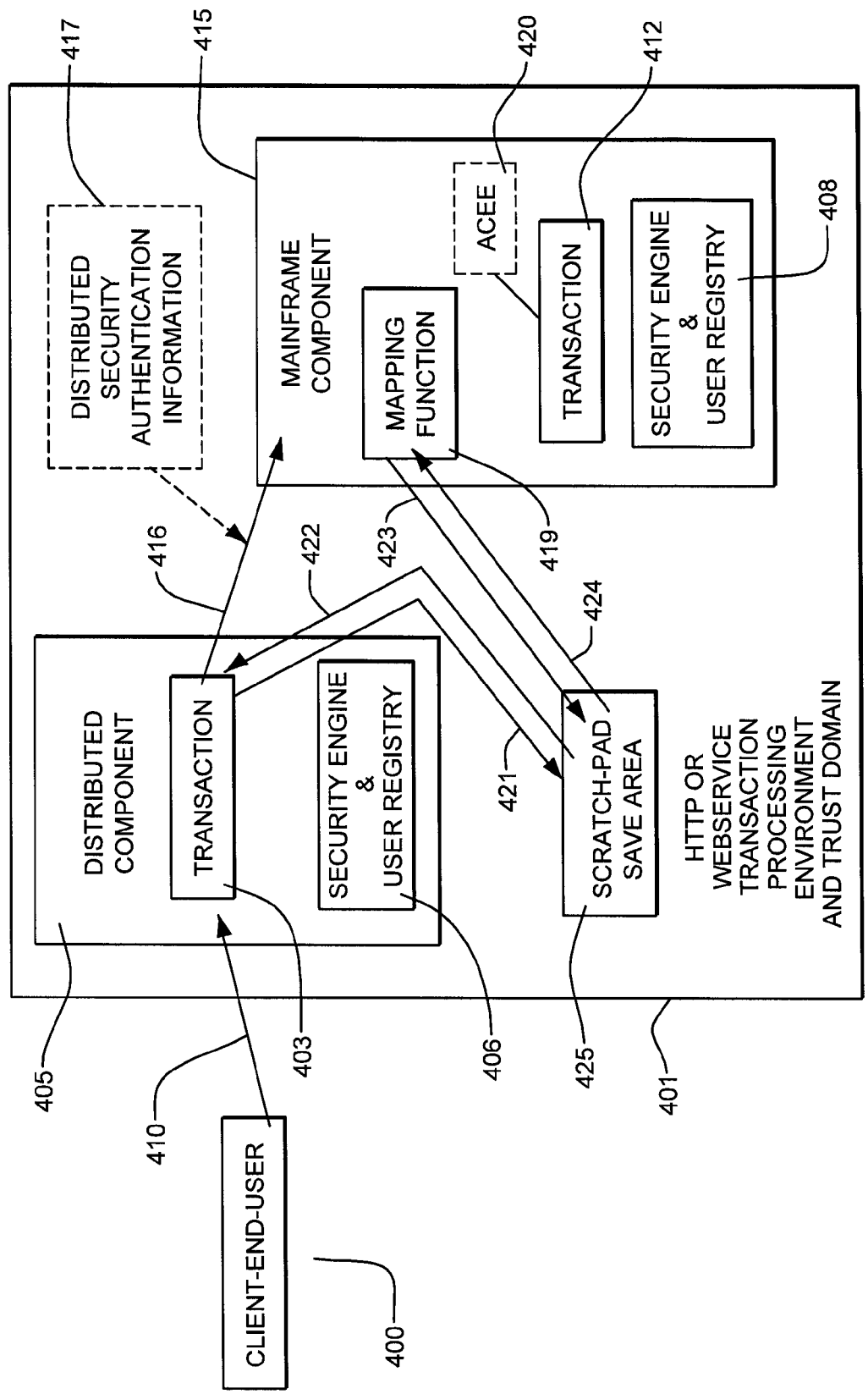
FIG. 4 depicts one embodiment of an alternative identification and authentication process for the environment of FIG. 3, wherein a restricted bandwidth message transmission protocol between components of the multi-component transaction-processing environment is employed, in accordance with an aspect of the present invention.

Another aspect of the present invention is depicted in FIG. 4, wherein the communication protocol 416, which is used to transmit the request of the distributed component of the multi-component transaction-processing environment 401 for execution of a particular transaction 412 within the mainframe component 415, is insufficient in bandwidth to contain the distributed security information. Note that FIGS. 4 & 3 are almost identical with the exception of the depiction of the scratch-pad area 425 and the flows to and from the scratch-pad area 421 through 424. With the exception of these items and the description of the distributed security information 417 which will be described next, the remaining items are identical in meaning and function with those of FIG. 3 of similar number (minus 100). Stated another way, with the stated exceptions, the items on FIG. 4 that are enumerated with the reference number 4 nm are identical to meaning and function as items on FIG. 3 enumerated with the reference numbers 3 nm, where nm are identical numbers between the figures.

As stated above, FIG. 4 depicts an example where the messaging protocol used in flow 416 has insufficient bandwidth to contain the distributed security information. In this case, transaction 403 invokes 421 the scratch-pad area 425 to temporarily store the distributed security information. The scratch-pad area function returns an address within the scratch-pad area, referred to herein as a 'token', that is small in size compared with the whole of the distributed security information, so that it can flow with the transaction request 416 in representation of the distributed security information 417.

As a further aspect of the present invention, the mainframe component 415 of the multi-component transaction-processing environment 408, upon receiving the processing request 416, invokes 423 the scratch-pad area function 425 passing it the distributed security information token 417 received in the request. The scratch-pad area function then returns 424 the complete distributed security information, and processing continues as depicted in FIG. 3.

Figure 8:
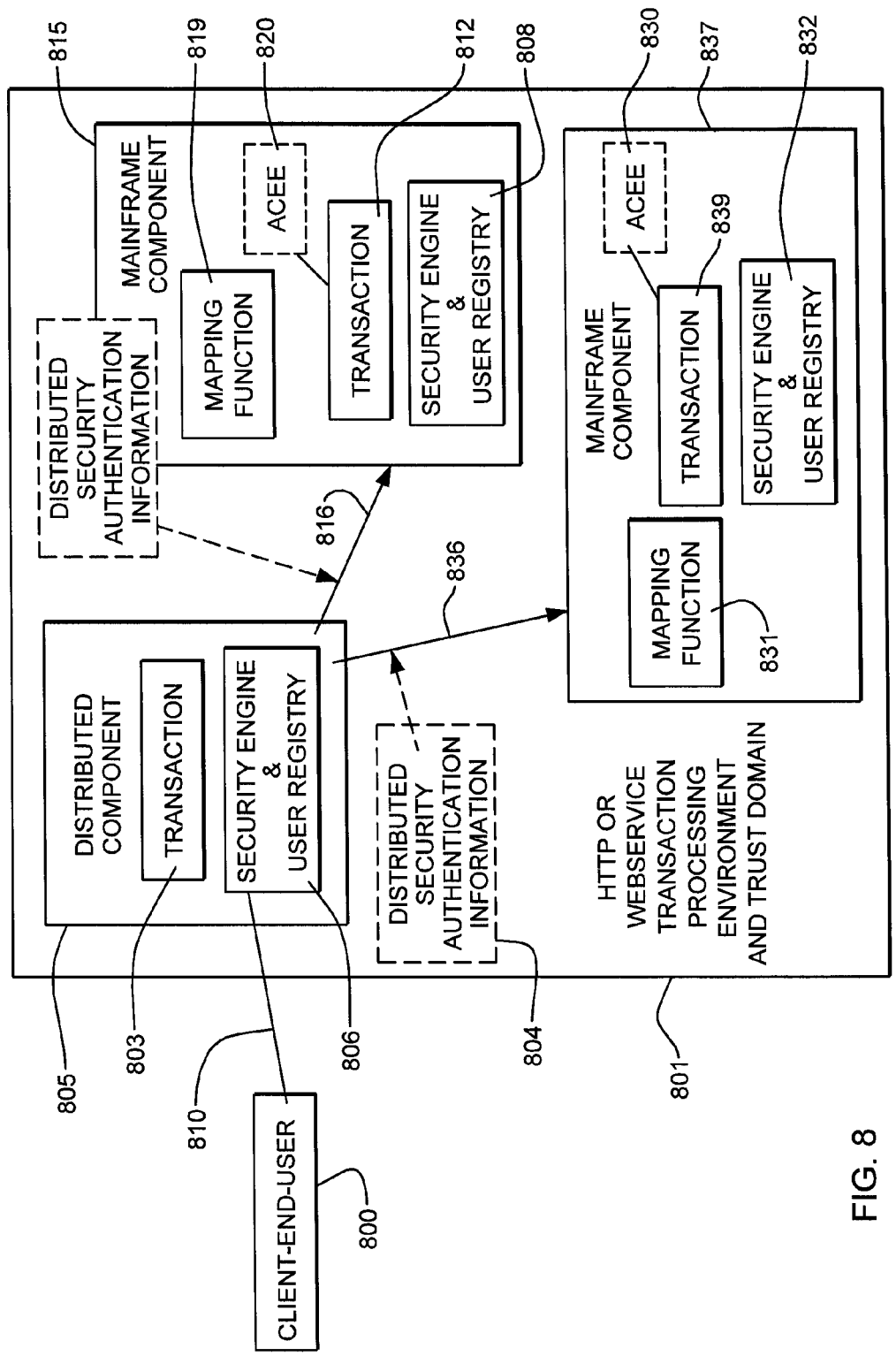
FIG. 8 depicts one example of a multiple component transaction-processing environment, wherein a distributed component exists along with multiple mainframe components, in accordance with an aspect of the present invention.

FIG. 8 illustrates an example of an identity propagation and translation processing flow wherein a single distributed component 805 of a multi-component transaction processing environment inter-operates with multiple mainframe components 815, 837 within the same transaction processing environment having disparate security engines and user registries 806, 808, 832. Although not illustrated, multiple mainframe components could also include mainframe components that are executing within entirely different computing machines and using entirely different local security engines and user registries.

The computing environment of FIG. 8 includes a transaction processing environment and trust domain 801 containing a distributed component 805, and multiple subsequent mainframe components 815, and 837. The distributed component is, for instance, Websphere Application Server and the mainframe components are, for example, Customer Information Control System (CICS) and Information Management System (IMS), all executing on a zSeries computer such as a z9-019, all offered by IBM.

When a client-end-user 800 signs 810 onto the distributed component 805 and requests distributed transaction 803, the execution of transaction 803 results in multiple requests 816, 836 for transactions 812, 839 within multiple mainframe components 815 and 837 of the overall transaction processing environment.

Mainframe components 815 and 837 may or may not be using the same user registry, and may or may not be executing within the same computer. As long as they are both participating in the same multi-component transaction-processing environment in which a secure messaging protocol and trust domain has been established between them and the distributed components (note that there could also be more than one distributed component), identity propagation and translation as taught with this invention can be embodied within the environment and exploited.

Regardless of where the mainframe components are executing it can be seen that identical distributed security authentication information is passed to each mainframe component within requests 816 and 836. Consequently, mapping functions 819 and 831 are exploited using identical distributed security authorization information. However, since these mapping functions are implemented within different mainframe components, they may produce entirely different results according to the local requirements of the particular mainframe component. That is, they may result in different mainframe user identities (and runtime security contexts, ACEEs 820 and 830), under which to execute the respective transaction requests, but this will be the correct mainframe identity from the perspective of the particular mainframe component. This behavior is an aspect and highly desirable feature of the present invention. Stated otherwise, when an initiated transaction request fans out into multiple further mainframe transaction requests executing on different mainframe components, using different mainframe security engines, including different user registries, with different mainframe user IDs, the identical distributed security information message is mapped at each mainframe component to a different local mainframe identity using, for example, local mapping rules and/or mapping configurations.

In still another aspect of the present invention, those skilled in the art will recognize that the presence of the time-stamp (within the distributed security information) provides the following useful feature. By simply sorting audit records that are generated as a byproduct of executing the mainframe transactions that were generated as part of the processing of the initial HTTP or Web Services (for examples) request, using the distributed user identity as a 'primary' sort key and the time-stamp as a secondary sort key, mainframe transactions that occur as a result of some initial distributed request, will be associated by the sorting function with that particular distributed request, and will appear together in the sort process printed report, as having resulted from the action of a particular distributed user who entered a particular distributed request. This feature will be of significant value from a security and management perspective when in practice multiple mainframe transactions fan-out from a single distributed request.

Note however, that any audit records produced during, and as a result of, the processing of the requested transactions, will contain a reflection of the distributed security authentication information, containing the identity of the client-end-user and his or her security realm (registry and security engine, e.g. Windows Active directory, or Kerberos realm) and distributed component time-stamp indicating when the initiating transaction 803 was started, plus the local mainframe component user identity used to execute the local transaction, as well as other information pertinent to the mainframe component.

To summarize, described above are various examples of authenticated identity propagation and translation in accordance with the present invention. An authenticated identity propagation and translation method is provided. The various techniques described herein are applicable to single physical computing systems, homogeneous systems, as well as heterogenous systems.

To more particularly summarize, disclosed herein is an authenticated identity propagation and translation method implemented in software executing at one or more computing system servers, the method comprising: propagation of the identity of a computer network client-end-user who has been previously identified and authenticated by for example entering a user-ID and password, within a distributed component of a multi-component transaction-processing system (or environment) including at least one distributed component and at least one mainframe component; secure propagation of the identified and authenticated client-user-identity from a distributed component of the multi-component transaction-processing environment to one or more subsequent mainframe components of said environment, in association with a transaction request from a distributed component of said environment to one or more mainframe components, in response to an initial transaction request from a networked client-end-user to a distributed component of said environment that requires the processing of a further transaction within a mainframe component of said environment in order to complete the initial transaction request; facilitation of the translation of the authenticated user's identity at the said distributed component of the said multi-component transaction processing environment, into an identity meaningful to at least one of the subsequent mainframe components of the said multi-component transaction-processing environment, without requiring the user to re-authenticate (for example to re-enter a password or enter another password) at the subsequent mainframe component; establishment of a trusted relationship (or trust-domain) between the security services, that is security engine and registry, of the distributed component of said environment and the mainframe component of said environment, such that secure messages containing identifying information about identified and authenticated client-end-users can flow from a distributed component to a mainframe component; using the securely flowed distributed security information that describes the identified and authenticated distributed client-end-user as the basis for determining the appropriate local mainframe user identity to associate with the mainframe component portion of the overall transaction processing environment; creating a local run-time security context representative of the said mainframe component user identity, and associating said run-time security context with the processing thread assigned to the processing of the mainframe portion of the overall transaction; and creating audit records resulting from any security relevant events associated with the execution of the mainframe portion of the overall transaction that include information that describes the distributed client-end-user who initiated the original distributed transaction request, as well as other relevant information such as the security domain (security engine and registry) where the client-end-user is known and by which the client-end-user was identified and authenticated, plus time-stamp indicating the approximate time relative to the distributed component that the transaction was initiated, thus facilitating sorting of mainframe transaction processing generated audit records according to the distributed client-end-user who cause them to occur and according to the particular initial request made by the distributed client-end-user, plus other relevant information.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the art that various modifications, additions, subtractions, substitutions and the like can be made without departing from the spirit of the invention and these are therefore considered to be within the scope of the invention as defined in the following claims.

What is claimed is:

1. An authenticated identity propagation and translation method implemented via one or more computer programs executing at one or more computing components of a multi-component transaction processing environment, the method comprising:

establishing an authenticated client-user identity at a distributed component of a multi-component transaction processing environment, the multi-component transaction processing environment further comprising at least one mainframe component, the distributed component and the at least one mainframe component employing security services with disparate user registries and different user identities for the client-user, and wherein the security services of the distributed component and the at least one mainframe component have a security trust relationship established therebetween and are coupled together via a secure networking function;

responsive to an initiated transaction request by the authenticated client-user at the distributed component requiring processing of a further transaction request at the at least one mainframe component, constructing a distributed security information message at the distributed component, the distributed security information message comprising an identity of the distributed component as known at the at least one mainframe component, and the authenticated client-user identity as known at the distributed component, and appending the distributed security information message to the further transaction request for forwarding from the distributed component to the at least one mainframe component;

validating the distributed security information message at the at least one mainframe component, and once validated, mapping at the at least one mainframe component the authenticated client-user identity of the client-user at the distributed component to a local mainframe identity employing the distributed security information message, and creating a local authenticated runtime security context representative of the local mainframe identity and the authenticated client-user identity for execution of the further transaction request at the at least one mainframe component; and further employing the distributed security message information at the at least one mainframe component when creating an audit record representative of execution of the further transaction request at the at least one mainframe component to associate the authenticated client-user identity at the distributed component therewith, wherein audit records of the at least one mainframe component can be employed in tracking execution of the further transaction request at the at least one mainframe component, and hence, tracking processing of the initiated transaction request of the client-user within the multi-component transaction processing environment.

2. The method of claim 1, further comprising responsive to receiving the further transaction request and associated distributed security information message at the at least one mainframe component, determining whether a local authenticated runtime security context already exists for the client-user initiating the transaction request at the distributed component, and if so, employing the existing local authenticated runtime security context in executing the further transaction request at the at least one mainframe component.

3. The method of claim 2, wherein constructing the distributed security information message further comprises establishing a cryptographic hash of a payload of the distributed security information message using a secret key shared between security services of the distributed component and the at least one mainframe component, and forwarding the cryptographic hash with the distributed security information message to the at least one mainframe component, and wherein the determining comprises employing the cryptographic hash at the at least one mainframe component to determine whether the local authenticated runtime security context already exists at the at least one mainframe component for the client-user of the distributed component.

4. The method of claim 1, wherein the constructing further comprises affixing a time-stamp to the distributed security information message, and wherein the further employing includes employing the time-stamp associated with the distributed security information message when creating the audit record representative of execution of the further transaction request at the at least one mainframe component, wherein tracking of the initiated transaction request and further transaction request is accomplished employing the authenticated client-user identity and the time-stamp associated with the distributed security information message constructed at the distributed component.

5. The method of claim 4, wherein constructing the distributed security information message further comprises establishing a cryptographic hash of a payload of the distributed security information message using a secret key shared between security services of the distributed component and the at least one mainframe component, and the constructing including affixing as a prefix the cryptographic hash and the time-stamp to the payload of the distributed security information message at the distributed component for forwarding to the at least one mainframe component.

6. The method of claim 1, further comprising transmitting the further transaction request and distributed security information message from the distributed component to the at least one mainframe component employing the security trust relationship therebetween, and wherein the validating at the at least one mainframe component occurs transparent to the client-user.

7. The method of claim 1, wherein the distributed security information message further comprises a mainframe security realm within which the distributed component is defined, a security realm of the client-user at the distributed component, and an indication of a method by which the client-user was authenticated at the distributed component.

8. The method of claim 7, wherein the further employing comprises employing the distributed security message information when creating the audit record so that the audit record describes the authenticated client-user identity initiating the transaction request at the distributed component, a security domain of the distributed component where the client-user was identified and authenticated, and the time-stamp indicating an approximate time that the transaction request was initiated.

9. The method of claim 1, wherein the multi-component transaction processing environment further comprises a shared memory or storage securely accessible by the distributed component and by the at least one mainframe component, and wherein the method further comprises determining whether there is insufficient data bandwidth in existing communication protocol in use between the distributed component and the at least one mainframe component to include the distributed security information message with the further transaction request, and if so:

temporarily writing the distributed security information message to the shared memory or storage, generating a token representative thereof, passing the token from the distributed component to the at least one mainframe component through the existing communication protocol in use between the distributed component and the at least one mainframe component, and employing the token at the at least one mainframe component to retrieve the distributed security information message from the shared memory or storage.

10. The method of claim 1, wherein the initiated transaction request at the distributed component results in multiple further transaction requests being forwarded to multiple mainframe components of the multi-component transaction processing environment, and wherein at least some mainframe components of the multiple mainframe components map the authenticated client-user identity of the client user at the distributed component to a different local mainframe identity employing the same distributed security information message, the at least some mainframe components of the multiple mainframe components employing different security services with disparate user registries and different user identities for the client-user.

11. An authenticated identity propagation and translation system for a multi-component transaction processing environment, the system comprising:
  means for establishing an authenticated client-user identity at a distributed component of a multi-component transaction processing environment, the multi-component transaction processing environment further comprising at least one mainframe component, the distributed component and the at least one mainframe component employing security services with disparate user registries and different user identities for the client-user, and wherein the security services of the distributed component and the at least one mainframe component have a security trust relationship established therebetween and are coupled together via a secure networking function;
  means for constructing a distributed security information message at the distributed component responsive to an initiated transaction request by the authenticated client-user at the distributed component requiring processing of a further transaction request at the at least one mainframe component, the distributed security information message comprising an identity of the distributed component as known at the at least one mainframe component, and the authenticated client-user identity as known at the distributed component, and for appending the distributed security information message to the further transaction request for forwarding from the distributed component to the at least one mainframe component;
  means for validating the distributed security information message at the at least one mainframe component, and once validated, for mapping at the at least one mainframe component the authenticated client-user identity of the client-user at the distributed component to a local mainframe identity employing the distributed security information message, and for creating a local authenticated runtime security context representative of the local mainframe identity and the authenticated client-user identity for execution of the further transaction request at the at least one mainframe component; and
  means for further employing the distributed security message information at the at least one mainframe component when creating an audit record representative of execution of the further transaction request at the at least one mainframe component to associate the authenticated client-user identity at the distributed component therewith, wherein audit records of the at least one mainframe component can be employed in tracking execution of the further transaction request at the at least one mainframe component, and hence, tracking processing of the initiated transaction request of the client-user within the multi-component transaction processing environment.

12. The system of claim 11, further comprising means for determining, responsive to receiving the further transaction request and associated distributed security information message at the at least one mainframe component, whether a local authenticated runtime security context already exists for the client-user initiating the transaction request at the distributed component, and if so, for employing the existing local authenticated runtime security context in executing the further transaction request at the at least one mainframe component.

13. The system of claim 12, wherein the means for constructing the distributed security information message further comprises means for establishing a cryptographic hash of a payload of the distributed security information message using a secret key shared between security services of the distributed component and the at least one mainframe component, and for forwarding the cryptographic hash with the distributed security information message to the at least one mainframe component, and wherein the means for determining comprises means for employing the cryptographic hash at the at least one mainframe component to determine whether the local authenticated runtime security context already exists at the at least one mainframe component for the client-user of the distributed component.

14. The system of claim 11, wherein the means for constructing further comprises means for affixing a time-stamp to the distributed security information message, and wherein the means for further employing includes means for employing the time-stamp associated with the distributed security information message when creating the audit record representative of execution of the further transaction request at the at least one mainframe component, wherein tracking of the initiated transaction request and further transaction request is accomplished employing the authenticated client-user identity and the time-stamp associated with the distributed security information message constructed at the distributed component.

15. The system of claim 14, wherein the means for constructing the distributed security information message further comprises means for establishing a cryptographic hash of a payload of the distributed security information message using a secret key shared between security services of the distributed component and the at least one mainframe component, and the means for constructing includes means for affixing as a prefix the cryptographic hash and the time-stamp to the payload of the distributed security information message at the distributed component for forwarding to the at least one mainframe component.

16. The system of claim 11, wherein the distributed security information message further comprises a mainframe security realm within which the distributed component is defined, a security realm of the client-user at the distributed component, and an indication of a method by which the client-user was authenticated at the distributed component.

17. The system of claim 16, wherein the means for further employing comprises means for employing the distributed security message information when creating the audit record so that the audit record describes the authenticated client-user identity initiating the transaction request at the distributed component, a security domain of the distributed component where the client-user was identified and authenticated, and the time-stamp indicating an approximate time that the transaction request was initiated.

18. The system of claim 11, wherein the multi-component transaction processing environment further comprises a shared memory or storage securely accessible by the distributed component and by the at least one mainframe component, and wherein the system further comprises means for determining whether there is insufficient data bandwidth in existing communication protocol in use between the distributed component and the at least one mainframe component to include the distributed security information message with the further transaction request, and if so:

for temporarily writing the distributed security information message to the shared memory or storage, generating a token representative thereof, passing the token from the distributed component to the at least one mainframe component through the existing communication protocol in use between the distributed component and the at least one mainframe component, and employing the token at the at least one mainframe component to retrieve the distributed security information message from the shared memory or storage.

19. The system of claim 11, wherein the initiated transaction request at the distributed component results in multiple further transaction requests being forwarded to multiple mainframe components of the multi-component transaction processing environment, and wherein at least some mainframe components of the multiple mainframe components map the authenticated client-user identity of the client user at the distributed component to a different local mainframe identity employing the same distributed security information message, the at least some mainframe components of the multiple mainframe components employing different security services with disparate user registries and different user identities for the client-user.

20. At least one program storage device readable by a machine, tangibly embodying at least one program of instructions executable by the machine to perform an authenticated identity propagation and translation method for a multi-component transaction processing environment, the method comprising:

establishing an authenticated client-user identity at a distributed component of a multi-component transaction processing environment, the multi-component transaction processing environment further comprising at least one mainframe component, the distributed component and the at least one mainframe component employing security services with disparate user registries and different user identities for the client-user, and wherein the security services of the distributed component and the at least one mainframe component have a security trust relationship established therebetween and are coupled together via a secure networking function;

responsive to an initiated transaction request by the authenticated client-user at the distributed component requiring processing of a further transaction request at the at least one mainframe component, constructing a distributed security information message at the distributed component, the distributed security information message comprising an identity of the distributed component as known at the at least one mainframe component, and the authenticated client-user identity as known at the distributed component, and appending the distributed security information message to the further transaction request for forwarding from the distributed component to the at least one mainframe component;

validating the distributed security information message at the at least one mainframe component, and once validated, mapping at the at least one mainframe component the authenticated client-user identity of the client-user at the distributed component to a local mainframe identity employing the distributed security information message, and creating a local authenticated runtime security context representative of the local mainframe identity and the authenticated client-user identity for execution of the further transaction request at the at least one mainframe component; and further employing the distributed security message information at the at least one mainframe component when creating an audit record representative of execution of the further transaction request at the at least one mainframe component to associate the authenticated client-user identity at the distributed component therewith, wherein audit records of the at least one mainframe component can be employed in tracking execution of the further transaction request at the at least one mainframe component, and hence, tracking processing of the initiated transaction request of the client-user within the multi-component transaction processing environment.

* * * * *